United States Patent
Woerner et al.

[11] Patent Number: 5,603,448
[45] Date of Patent: Feb. 18, 1997

[54] PROCESS AND APPARATUS FOR CYLINDRICAL JOINT FRICTION WELDING

[75] Inventors: Otto Woerner, Reutlingen; Rudolf Reinhardt, Esslingen; Heinz Schultz, Hochdorf, all of Germany

[73] Assignee: Mercedes-Benz AG, Germany

[21] Appl. No.: 362,935

[22] Filed: Dec. 23, 1994

[30] Foreign Application Priority Data

Dec. 24, 1993 [DE] Germany ............... 43 44 561.6

[51] Int. Cl.⁶ .................................................. B23K 20/12
[52] U.S. Cl. ........................................ 228/114.5; 228/2.3
[58] Field of Search .................... 228/113, 114.5, 228/2.3

[56] References Cited

U.S. PATENT DOCUMENTS

| | | | |
|---|---|---|---|
| 3,235,312 | 2/1966 | Hollander | 228/114.5 |
| 3,275,108 | 9/1966 | General | 74/763 |
| 3,504,425 | 4/1970 | Sutovksy et al. | 228/114.5 |
| 3,584,520 | 6/1971 | Borman | 74/763 |
| 3,665,707 | 5/1972 | Koivunen | 60/54 |
| 4,033,501 | 7/1977 | Ambrose, Jr. et al. | 228/113 X |
| 4,323,185 | 4/1982 | Grilli et al. | 228/114.5 |
| 4,387,844 | 6/1983 | Frank | 228/113 |

FOREIGN PATENT DOCUMENTS

| | | |
|---|---|---|
| 3626009C2 | 10/1988 | Germany. |
| 3815957A1 | 11/1989 | Germany. |
| 3-243286 | 10/1991 | Japan. |
| 3-234383 | 10/1991 | Japan. |
| 1053149 | 12/1966 | United Kingdom. |
| 1053148 | 12/1966 | United Kingdom. |
| 1093632 | 12/1967 | United Kingdom. |
| 1188583 | 4/1970 | United Kingdom. |

OTHER PUBLICATIONS

Wichelhaus/Gruenauer "Preconditions and Prospects for Friction Butt–Welding", German Journal MM Maschinenmarkt No. 70/1975, Vogel–Verlag Wurzburg.
Schweissen und Schneiden, Year 20 (1968), Issue 11.
Eichhorn/Borowka, Schweissen und Schneiden, vol. 128 (1986), No. 20—Oct.

*Primary Examiner*—Kenneth J. Ramsey
*Attorney, Agent, or Firm*—Evenson, McKeown, Edwards & Lenahan, P.L.L.C.

[57] ABSTRACT

In an outer shell of a pump impeller of a hydrodynamic torque converter, an axial connecting branch of a hub is joined by friction welding to a bearing sleeve, which exhibits axial driving teeth for driving a recirculating positive-displacement pump. The friction welding apparatus uses a respective receiving fixture for holding the joint parts and a device for machining a weld bead with a tool.

6 Claims, 3 Drawing Sheets

PROCESS AND APPARATUS FOR CYLINDRICAL JOINT FRICTION WELDING

BACKGROUND AND SUMMARY OF THE INVENTION

The present invention relates to a friction welding apparatus and process, and more particularly, to an apparatus and process for friction welding of cylindrical joint parts using a respective receiving fixture for holding the joint parts and a device for confining a weld bead during a weld upsetting procedure. The process comprises steps in which the receiving fixtures, one of which is rotary-drivable about a rotational axis, are mutually displaceable along a direction of the rotational axis, and in which, during an upsetting procedure, the rotary-drivable receiving fixture are set in rotation, the joint parts are pressed together with the application of axial compression forces and are heated in the region of a bonding zone situated at adjacent end faces thereof, and in which the weld bead in the warm state, in the region of origin of the welding burr, is confined during the weld upsetting procedure.

In a known process of the type stated in the introduction of Wichelhaus/Gruenauer "Preconditions Prospects for Friction Butt-Welding", German Journal "MM Maschinenmarkt", No. 70/1975, Vogel-Verlag Wurzburg, expulsion of plastic material from the torsional-flow zone during a welding operation produces, at the junction point, a welding burr. By virtue of faster cooling, the burr is generally harder than the welding zone which has a fine-grained recrystallization structure and therefore favorable strength and toughness characteristics. Nevertheless, the welding burr in the known process is twisted off, while still warm, immediately after the welding operation is completed.

The burrs which are formed in the friction welding disrupt the usability of the structural part having the weld joint. A mechanical removal (machine-cutting process), such as in the known case, is very complex, however, because the burr has a very high strength, by virtue of this welding process.

In the known process, the actual welding or upsetting procedure is preceded by a joint-part preparation procedure which relinquishes, however, an abutting-face preparation in the case of virtually plane-parallel severance cuts and, with respect to thin-walled pipes, is more or less restricted to measures to keep the axial slip as low as possible, but otherwise simply to remove coatings and impurities from the abutting faces.

It is further known from U.S. Pat. No. 3,584,520, in the case of a hydrodynamic torque converter, that a centric bearing sleeve is attached by its one front end to a radial connecting face of a hub and is joined to the latter by a fillet weld, with the hub being situated radially inside of the outer shell of a pump impeller and being configured in one piece with this outer shell.

According to German Journal: "Schweiβen und Schneiden", Year 20 (1968), Issue 11, tough competition with domestic and foreign industry is constantly forcing motor-vehicle manufacturers to check new technological developments to see whether they might contribute, within the framework of large-scale production, to solving existing technical problems and to achieving more economical working methods. Since friction welding, as a joining process for butt seams, reportedly offers some basic production-engineering and welding advantages over joining methods previously used in a number of motor vehicle parts, it would already been used in the motor vehicle shortly after its development to practical maturity. Among a selection of applications, this publication shows an impeller of a recirculating positive-displacement pump. According to the publication, friction welding can also be used in the production of a splined shaft. The separate manufacture of a pipe part having inner grooves and the connection of the finished piece to the other shaft part make it substantially easier for grooves to be introduced in the bore.

According to Eichhorn/Borowka "Schweiβen und Schneiden", VDI-Journal, Vol. 128 (1986), No. 20—October (II), p. 806, the suitability also of turbine blades, turbine wheels and runner rims to flywheel welding is proven. In overall terms, it is not only for the manufacture of high-precision, safety-related structural parts that friction welding has reportedly proved its worth.

Finally, it is known that the joint parts should have at the abutment points, where possible, the same cross-sections. The joining of parts having unequal abutment point cross-sections could be carried out, without difficulties, in the same way as welding bolts or pipes onto metal plates.

An object of the present invention is to provide a friction-welding process and apparatus which ensure usability by preventing a disruptive burr without expensive added complexity.

The foregoing object has been achieved according to the present invention by a process wherein a geometric end shape of the weld bead following completion of the upsetting procedure is defined by a form tool, which is respectively disposed immovably in the direction of the rotational axis relative to the one receiving fixture such that relative to the bonding zone, the plastic material forced out of the bonding zone during the upsetting procedure is brought into the end shape, without cutting, by a form face of the form tool, no later than completion of the upsetting procedure.

In the process according to the present invention, the weld bead is shaped during the welding procedure such that usability is obtained without any subsequent working, because there is no longer any possibility of a disruptive burr being present. A joint-part preparation with the intention of facilitating the deformation of the still warm weld bead, for the prevention of the welding burr, is obtainable.

Where the process according to the present invention is applied to friction welding in order to join end faces of a centric bearing sleeve and of a coaxial, single-part connecting branch, belonging to a radially inner hub configured in one piece with an outer shell of a pump impeller of a hydrodynamic torque converter, a special joint-part preparation is able to be relinquished. This is because the weld bead, which has formed at the transition of the end faces, joined together by welding, into the respectively axially adjoining outer contacting surface, is at least partially expelled in the direction of the transition between the hub and the connecting branch.

The present invention also relates to apparatuses for realizing the novel process of the present invention such that the weld bead is shaped advantageously during the welding procedure.

In the process according to the invention, upon completion of the welding procedure, when the weld bead is deformed during cooling of the bonding zone, a situation can be reached, due to the still revolving rotary-driven receiving fixture and the temperature cycle of the friction-welding machine, in which the coaxiality of the two receiving fixtures in relation to the rotational axis is abolished. This coaxiality error is all the greater, the more elastic is the machine frame between the two receiving fixtures.

Other aspects of the process according to the present invention focus upon preventing the described coaxiality errors.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
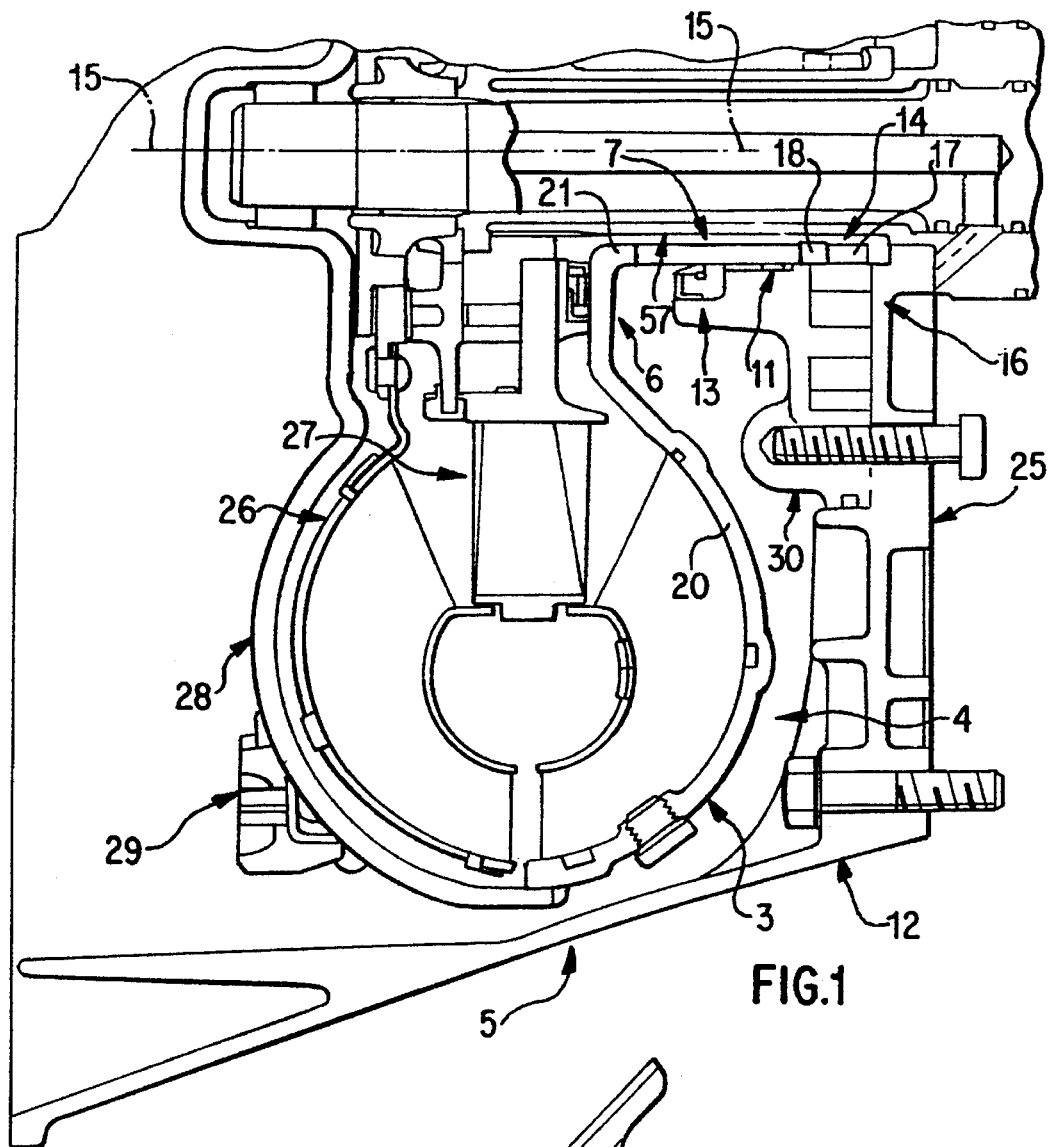
FIG. 1 is a partial axial-section containing the rotational axis through a hydrodynamic torque converter with an outer shell of a pump impeller, in which the outer shell has a friction-weld joint, created with the process according to the present invention, between its hub and a bearing sleeve.
Figure 2:
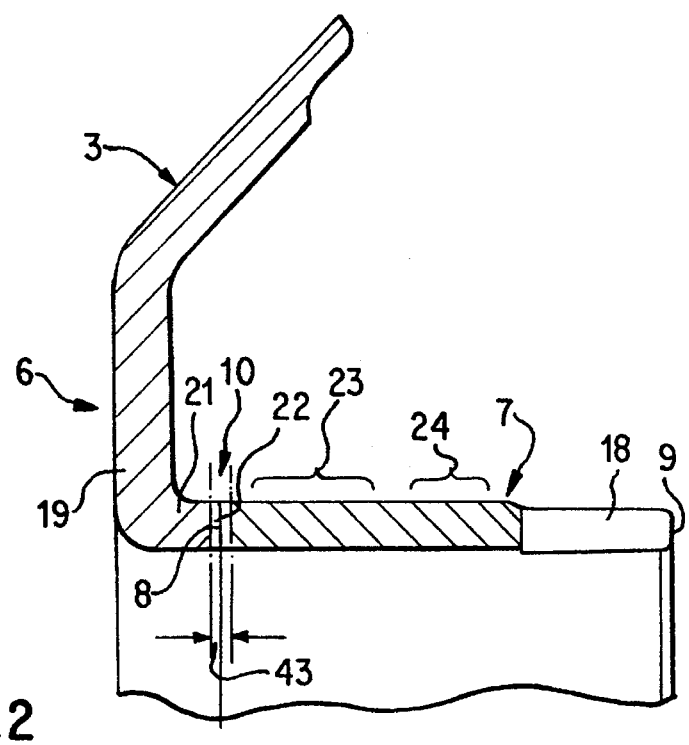
FIG. 2 is a partial-regional view, showing the bonding zone, of the friction-weld joint between the outer shell and the bearing sleeve, as an enlarged detail of FIG. 1.

With reference to FIGS. 1 and 2, a hydrodynamic torque converter 5 is received in a non-rotary, bell-shaped outer housing 12, which is open at its wide end and is closed off at its narrow end by an end wall 25. The hydrodynamic torque converter 5 has, for the formation of a hydrodynamic operating circuit in the conventional manner, a pump impeller 4, a turbine wheel 26 and a guide wheel 27. The outer shell 3 of the pump impeller 4 is joined in a rigid and liquid-tight manner to a shell-shaped converter housing 28 which overlaps the turbine wheel 26 and has, on its outer front side, fastening eyes 29 for connection of a driving pulley joined to a crankshaft of an internal-combustion engine in a known manner.

The outer shell 3 has a radially directed inner hub 6 which is bulged in its cross-section 19 (FIG. 2) relative to the adjoining middle region 20 of the outer shell 3 and is configured in one piece with a connecting branch 21 concentric to the rotational axis 15—15 of the converter 5.

A bearing sleeve 7 is situated concentric to the rotational axis 15—15 of the converter 5 and is rigidly joined by its one front end 8 to the front end 22 of the connecting branch 21 by a friction-weld joint 10.

On the front side of the end wall 25 facing the torque converter 5, a recirculating-displacement pump 16 is disposed, concentric to the rotational axis 15—15 of the converter, and is received in a pump housing 30 fastened to the end wall 25. Relative to the pump housing 30 and hence relative to the outer housing 12, the bearing sleeve 7 is rotatably supported by a bearing 11 and sealed by a seal arrangement 13.

The bearing sleeve 7 is in working or operative connection, by way of a drive connection 14, with the recirculating positive-displacement pump 16. The drive connection 14 includes both radial driving teeth 17 of the pump 16 and axial driving teeth 18, which engage in the driving teeth 17 and are provided at the other front end 9 of the bearing sleeve 7 and configured in one piece with the bearing sleeve 7. The bearing sleeve 7 is completely ready-worked prior to the friction welding, with its hardened bearing face 24 for the bearing 11, its hardened sealing face 23 for the seal arrangement 13 and its axial driving teeth 18 for driving the recirculating positive-displacement pump 16.

Figure 3:
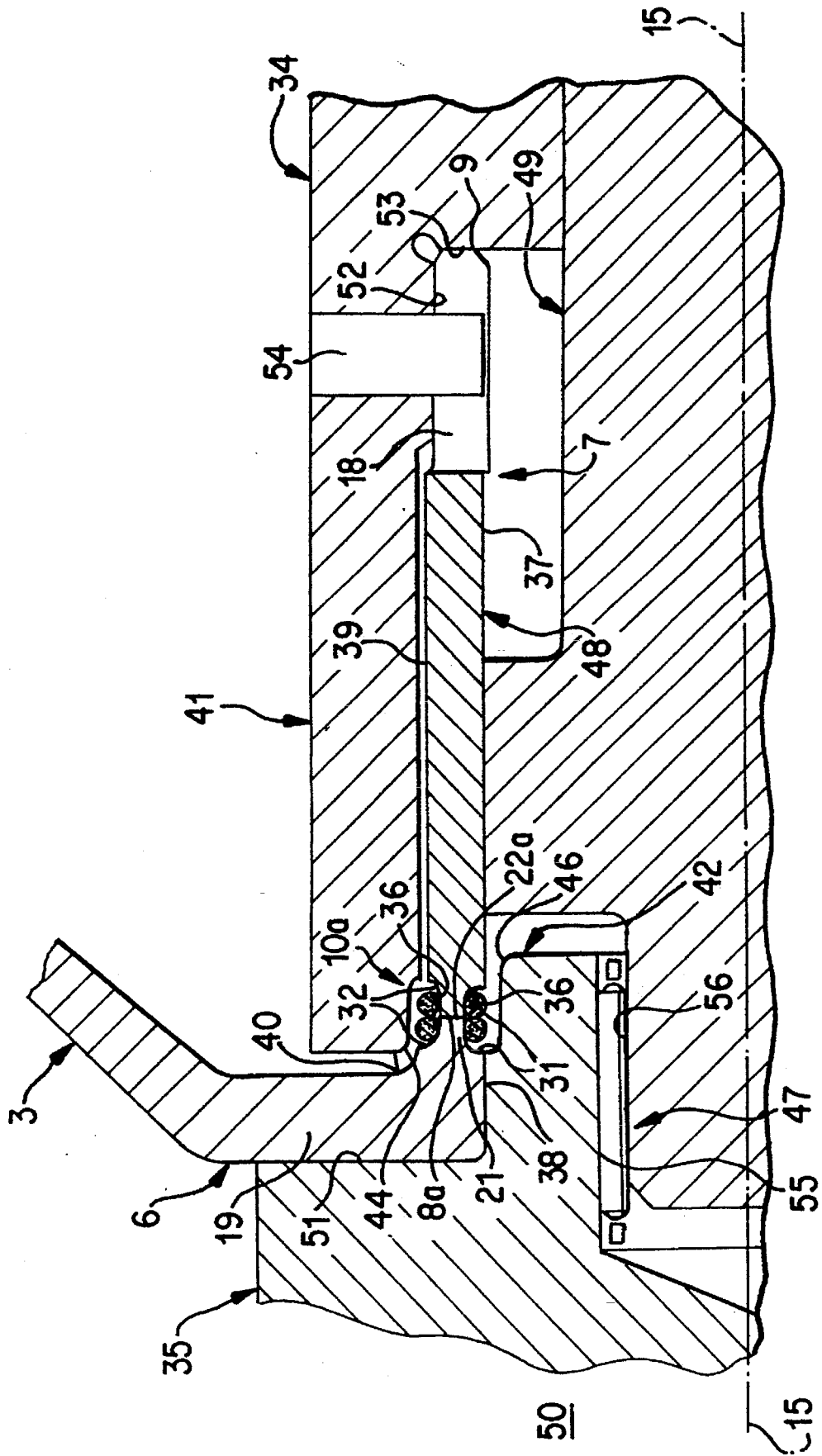
FIG. 3 is a partial-regional view corresponding to FIG. 2, in which the outer shell has a friction-weld joint, created with the process according to the present invention, between its hub and a bearing sleeve, and in which two separate embodiments of the process according to the present invention are shown with reference to a schematic representation of receiving fixture parts and apparatus parts for the friction welding.
Figure 4:
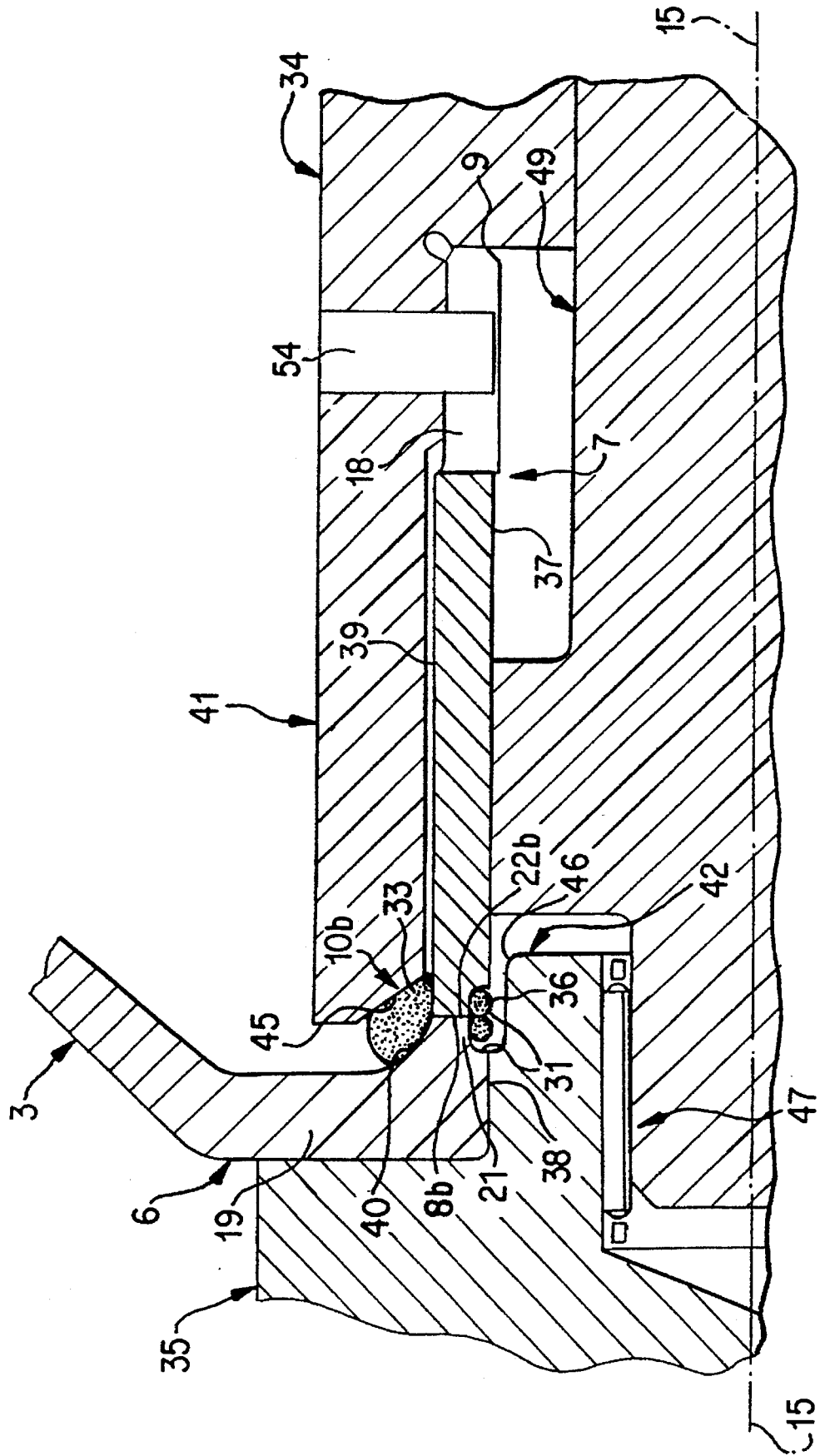
FIG. 4 is a partial-regional view corresponding to FIG. 2, in which the outer shell has a friction-weld joint, created with the process according to the present invention, between its hub and a bearing sleeve, and in which the process according to the invention, in a third embodiment, is likewise shown with reference to a schematic representation of receiving fixture parts and apparatus parts for the friction welding.

In order, in the subsequent friction welding, to prevent radial constriction known in pipe welding in the region of the seam, the bearing sleeve 7 is elastically expanded, prior to the start of welding, by an inner clamp arbor 49 (FIG. 3 or FIG. 4).

The embodiment of FIG. 3 differs from the embodiment of FIGS. 1 and 2 primarily by virtue of radially inner and outer chamfers 31, 32 at the front ends 8a and 22a, to be joined together by friction welding, of the bearing sleeve 7 and connecting branch 21. For matching features of both embodiments, the same reference symbols are used so that reference can otherwise be made, in relation to the embodiment of FIG. 3, to the figure description of FIGS. 1 and 2.

The inner chamfers 31 form a concave transition between the respective end face 8a or 22a and the respectively axially adjoining, inner cylindrical contacting surface 37 of the bearing sleeve 7 or the axially adjoining, inner cylindrical contacting surface 38 of the connecting branch 21. The outer chamfers 32 form a concave transition between the respective end face 8a or 22a and the axially adjoining, outer cylindrical contacting surfaces 39 of the bearing sleeve 7 or the axially adjoining, outer contacting surface 40 of the connecting branch 21. The chamfers 31, 32 serve to receive the plastic material forced out of the bonding zone 43 (FIG. 2) during the upsetting procedure by a cylindrical form face 46 of an inner form tool 42 disposed in motionally fixed arrangement relative to a receiving fixture 35 for the hub 6, into the inner chamfers 31, and by a form face 44 of an outer form tool 41 disposed in motionally fixed arrangement relative to a receiving fixture 34 for the bearing sleeve 7, into the outer chamfers 32, and thereby forms a respective weld bead 36 without any outer disruptive burr.

The receiving fixture 35 has a cylindrical centering face 50, which centers the hub 6, via the inner casing 38, relative to the rotational axis 15—15. The receiving fixture 35 exhibits a radial supporting face 51 for the thickened region 19 of the hub 6, so as to absorb the axial forces during the upsetting procedure.

The receiving fixture 34 has an inner cylindrical centering face 52 enabling it to center the bearing sleeve 7, by its end portion having the driving teeth 18, relative to the rotational axis 15—15. The receiving fixture 34 has a radial supporting face 52 for the front end 9 of the bearing sleeve 7, so as to absorb the axial forces during the upsetting procedure. The receiving fixture 34 is driven, during the welding procedure, in the direction of rotation, i.e. rotated relative to the rotational axis 15—15.

For the transportation of the bearing sleeve 7 during its rotation, the receiving fixture 34 has radial driving pins 54, which extend between the driving teeth 18 in the peripheral direction. The cylindrical clamp arbor 49 engaging in the central opening 48 in the bearing sleeve 7, as the latter undergoes slight elastic expansion, is disposed centric to the rotational axis 15—15 so as to be motionally fixed relative to the receiving fixture 34.

In order to prevent any coaxiality errors which might arise after the welding procedure is completed, as the bonding zone 43 cools down, the two receiving fixtures 34, 35 are reciprocally centered by a bearing arrangement 47. The arrangement 47 is provided structurally between a respective bearing protrusion 55, 56 of the receiving fixture 35 and clamp arbor 49.

The embodiment of the outer shell 3 according to FIG. 4, inclusive of the receiving fixture parts and apparatus parts for the friction welding according to the present invention, differs from the above-described embodiment of FIG. 3 purely by virtue of the shaping of the outer weld bead 33. For matching features of these two embodiments, the same reference symbols are used, so that reference can otherwise be made to the figure description to FIG. 3.

In FIG. 4, chamfers are not provided for the respectively radially outer region of the end faces 8b, 22b to be welded together, but rather the outer form tool 41 has a conical form face 45 which is disposed relative to the bonding zone 43 (FIG. 2) so that, during the upsetting procedure, the plastic material forced out of the hot bonding zone 43 is expelled by the form face 45 into the transition zone between the outer contacting surface 40 of the connecting branch 21 and the thickened flanged portion 19 of the hub 6.

The embodiments of FIGS. 3 and 4 serve to ensure that the annular gap between the bearing sleeve 7 and a non-rotary stator shaft 57 for supporting the guide wheel 27 relative to the end wall 25 remains free from welding burr and hence remains usable for the supply of pressure medium to the hydrodynamic operating circuit of the torque converter 5.

The embodiments of FIGS. 3 and 4 further serve to guarantee that during the assembly of the torque converter 5 and outer housing 12, in which assembly the rotational axis 15—15 of the converter is aligned preferably upright, the pre-fitted seal 13 cannot be damaged by a welding burr on the outer casing of the bearing sleeve 7 as it travels into the bearing neck, belonging to the bearing arrangement 11, of the pump housing part 30.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for friction welding of end faces of joint parts comprising a central bearing sleeve and a coaxial single-part connecting branch having a one-piece radially extending inner hub and outer shell of a pump impeller of a hydrodynamic torque converter using respective receiving fixtures for holding the joint parts and a form tool for confining a weld bead during a weld upsetting procedure, comprising the steps of mutually displacing the receiving fixtures, one of which is rotatably driven about a rotational axis, along a direction of the rotational axis, and rotating during an upsetting procedure, the rotatable driven receiving fixture, pressing together narrowed axial end parts of the joint parts with the application of axial compression forces, thereby friction welding the joint parts in the region of a bonding zone situated at adjacent end faces thereof, and defining a geometric end shape of the weld bead following completion of the upsetting procedure by the form tool which is fixed relative to the one receiving fixture such that, the plastic material forced out of the bonding zone during the upsetting procedure is brought into the end shape, without cutting, by a form face of the form tool, no later than completion of the upsetting procedure.

2. An apparatus for friction welding of cylindrical joint parts having narrowed axial end parts, comprising receiving fixtures for holding the joint parts, the receiving fixtures being relatively rotatably driven about a rotational axis and the receiving fixtures being mutually displaceable along a direction of the rotational axis such that, during an upsetting procedure, the receiving fixtures are relatively rotated and the narrowed axial end parts are pressed together with application of axial compression forces for heating the joint parts in the region of a bonding zone situated at adjacent end faces thereof to form a weld bead, tool means for conforming the weld bead in a warm state wherein the tool means is configured and arranged to define a geometric end shape of the weld bead following completion of the upsetting procedure and disposed with respect to the receiving fixtures such that, relative to the bonding zone and a form face of the tool means is configured to bring the plastic material forced out of the bonding zone during the upsetting procedure into the end shape without cutting no later than completion of the upsetting procedure, and at least one bearing arrangement for mutually supporting the receiving fixtures in directions perpendicular to the rotational axis.

3. The apparatus according to claim 7, wherein one of said receiving fixtures includes a clamp arbor for the friction welding of a sleeve-shaped joint part, wherein the at least one bearing arrangement is operatively arranged between the clamp arbor and the receiving fixture holding the other joint part.

4. Process for friction welding of tubular joints parts by utilizing receiving fixtures for holding the joint parts whereby one of said receiving fixtures is rotatably drivable and the receiving fixtures are displaceable relative to each other in directions of a rotational axis of the one receiving fixture, and the rotatably-drivable receiving fixture is displaceable during an upsetting procedure, comprising the steps of pressing the joint parts against each other axially at a bonding zone, heating the joint parts in an area of the bonding zone neighboring end faces of the joint parts, and processing one of the joint parts prior to the upsetting procedure in a joint part preparation step in at least the area of the end faces connected to each other by friction welding, wherein the joint part preparation step is accomplished prior to the beginning of friction welding by an elastic widening of the joint part via an inner clamp arbor.

5. Apparatus for carrying out the process of claim 4, wherein the clamp arbor inserted into the one joint part is disposed both centric to the rotational axis and fixedly with respect to the receiving fixture holding the one joint part.

6. The apparatus according to claim 5, wherein a bearing arrangement which mutually supports the two receiving fixtures in directions perpendicular to the rotational axis is operatively arranged between the clamp arbor and the receiving fixture holding the other joint part.

\* \* \* \* \*